United States Patent
Imaizumi et al.

(10) Patent No.: US 8,956,087 B2
(45) Date of Patent: Feb. 17, 2015

(54) TOOL

(75) Inventors: Hideaki Imaizumi, Toyokawa (JP); Tetsuya Adachi, Toyokawa (JP)

(73) Assignee: OSG Corporation, Aichi (JP)

(*) Notice: Subject to any disclaimer, the term of this patent is extended or adjusted under 35 U.S.C. 154(b) by 0 days.

(21) Appl. No.: 13/504,100

(22) PCT Filed: Oct. 6, 2011

(86) PCT No.: PCT/JP2011/073101
§ 371 (c)(1),
(2), (4) Date: Apr. 25, 2012

(87) PCT Pub. No.: WO2013/051132
PCT Pub. Date: Apr. 11, 2013

(65) Prior Publication Data
US 2014/0212230 A1 Jul. 31, 2014

(51) Int. Cl.
*B23C 5/10* (2006.01)

(52) U.S. Cl.
CPC .............. *B23C 5/10* (2013.01); *B23C 2210/088* (2013.01)
USPC ............................................. 407/53; 407/63

(58) Field of Classification Search
CPC .................... B23C 2210/086; B23C 2210/088
USPC .......................................... 407/53, 54, 61, 63
See application file for complete search history.

(56) References Cited

U.S. PATENT DOCUMENTS

| 4,770,567 | A * | 9/1988 | Moriarty .......................... 407/59 |
| 5,221,163 | A * | 6/1993 | Nishimura ....................... 407/53 |
| 8,366,354 | B2 * | 2/2013 | Davis ............................... 407/59 |
| 8,827,600 | B2 * | 9/2014 | Maeda et al. .................... 407/53 |
| 2012/0020749 | A1 | 1/2012 | Maeda et al. |

FOREIGN PATENT DOCUMENTS

| DE | 3532258 A1 * | 9/1987 |
| DE | 202008000350 U1 * | 5/2008 |
| JP | 61-284313 | 12/1986 |
| JP | 63-034010 | 2/1988 |
| JP | 01127214 A * | 5/1989 |
| JP | 08039323 A * | 2/1996 |
| JP | 11-027214 | 1/1999 |
| JP | 2001121340 A * | 5/2001 |
| JP | 2002-233910 | 8/2002 |
| JP | 2011-083891 | 4/2011 |

* cited by examiner

*Primary Examiner* — Daniel Howell
*Assistant Examiner* — Nicole N Ramos
(74) *Attorney, Agent, or Firm* — Muramatsu & Associates

(57) ABSTRACT

To provide a tool that can reduce the maximum value of cutting resistance when adjacent peripheral edges cut a workpiece simultaneously. A lead L of a spiral flute 21, a waveform pitch P, the number of edges N of peripheral edges 22, and a natural number m are set to satisfy L/N=m×P−P/N±P/2 or L/N=m×P+P/N±P/2, the waveforms of adjacent ones of the peripheral edges 22 at the positions where they contact a workpiece simultaneously are in an anti-phase relationship when the adjacent peripheral edges 22 cut the workpiece simultaneously. Therefore, there is an effect that the length of the cutting edges that contact the workpiece simultaneously is shortened to reduce the maximum value of cutting resistance.

2 Claims, 7 Drawing Sheets

TOOL

This application is a national stage of International Patent Application No. PCT/JP2011/073101 filed Oct. 6, 2011, the entire contents of which are incorporated herein by reference.

TECHNICAL FIELD

The present invention relates to a tool, and in particular to a tool that can reduce the maximum value of cutting resistance when adjacent peripheral edges cut a workpiece simultaneously.

BACKGROUND ART

Regarding a tool, such as an end mill and a milling cutter, that performs cutting process on a workpiece with peripheral edges, there is a technique of shortening the length of cutting edges that contact a workpiece and accordingly reducing cutting resistance by that much by adopting wave-shaped roughing formed cutting edges or interrupted cutting edges provided with nicked teeth at a constant interval as peripheral edges. In the roughing formed cutting edges and the interrupted cutting edge, the phases of waveforms of adjacent peripheral edges in an axial direction are shifted. The phase shifts are normally set to a constant value obtained by dividing a waveform pitch with the number of edges, and the phases of adjacent peripheral edges are shifted by the constant value. That is, in a cross section vertical to an axis, the phases are shifted by one pitch per round (see FIG. 9 of Japanese Patent Application Laid-Open Publication No. JP 63-34010, and see also page 4, lower right column, lines 3-16, FIG. 3, etc. of JP 63-34010).

In this case, as described above, JP 63-34010 discloses a technique in which phase shifts are specified using a predetermined relational expression to make two or more cutting edges of a same dimension and a same shape appear on a cross-section vertical to an axis, noting that the configuration using phase shifts of a constant value to shift by one pitch per round is not sufficient in extending a tool life and improving processing efficiency. Also, as described above, Japanese Patent Application Laid-Open Publication No. JP 11-27214 discloses a technique in which phase shifts are made irregular because if phase shifts between adjacent peripheral edges are regular, chattering vibration is generated (see also page 3, upper right column, lines 3-11, FIG. 2, etc. of JP 11-27214).

On the other hand, Japanese Patent Application Laid-Open Publication No. JP 2002-233910, in paragraph [0009], etc. discloses a technique of increasing/decreasing waveform pitches and the like at a predetermined cycle because if the waveforms of roughing formed cutting edges or interrupted cutting edges are provided periodically in a constant dimension over a total length of a peripheral edge, chattering vibration is generated.

SUMMARY OF INVENTION

Technical Problem

However, although in the technique of JP 63-34010, the relationship of diameters of cutting edges in a cross-section vertical to an axis is specified, and also in the techniques of JP 11-27214 and JP 2002-233910, waveform pitches are specified such that a manner of cutting of a single peripheral edge when it cuts a workpiece is changed, none of the techniques noted above specify a relationship between waveforms of adjacent peripheral edges at the positions where they contact a workpiece simultaneously when the adjacent peripheral edges cut the workpiece simultaneously. Hence, there are problems that, because the length of cutting edges that contact a workpiece simultaneously are determined randomly, there may be cases that shortening of the length of cutting edges that contact a workpiece, which should be expected by adopting a roughing formed cutting edge or an interrupted cutting edge, is not sufficient, and an effect of reducing the maximum value of cutting resistance is insufficient.

The present invention has been made to address the above-described problems, and an object thereof is to provide a tool that can reduce the maximum value of cutting resistance surely when adjacent peripheral edges cut a workpiece simultaneously.

Solution to Problem and Advantageous Effects of Invention

Because, in a tool according to the present invention, a lead L of a spiral flute, a waveform pitch P, the number of edges N of peripheral edges, and a natural number m are set to satisfy $L/N = m \times P - P/N \pm P/2$ or $L/N = m \times P + P/N \pm P/2$, the waveforms of adjacent ones of the peripheral edges at the positions where they contact a workpiece simultaneously are in an anti-phase relationship when the adjacent peripheral edges cut the workpiece simultaneously. Therefore, there is an effect that the length of the cutting edges that contact the workpiece simultaneously is shortened to reduce the maximum value of cutting resistance surely.

Also because, according to the present invention, the lead L, the pitch P, and the number of edges N are set to satisfy either of the above-described relational expressions, the waveforms of the peripheral edges can be formed in a same shape at a same pitch while attaining the above-described effect. Therefore, there is an effect that the process becomes easy, and accordingly the manufacturing cost is reduced by that much.

DESCRIPTION OF EMBODIMENTS

Figure 1:
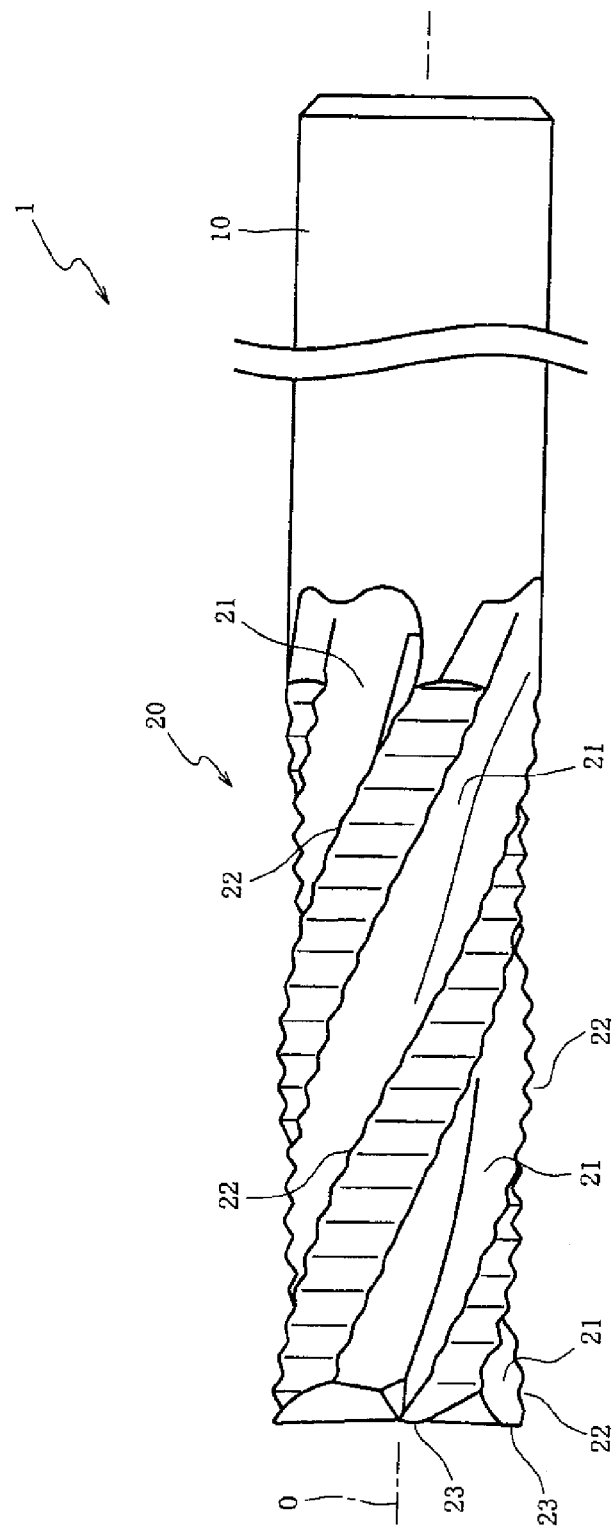
FIG. 1 is a front view of a roughing end mill according to a first embodiment of the present invention.

Hereinafter, preferred embodiments of the present invention are explained with reference to accompanying drawings. FIG. 1 is a front view of a roughing end mill 1 according to a first embodiment of the present invention.

As shown in FIG. 1, the roughing end mill 1 is a tool in which a shank 10 is formed at one end thereof, and retained by a processing machine such as a machining center, and the roughing end mill 1 performs cutting process such as side cutting and flute cutting with an edge part 20 while the shank 10 is rotated about an axis O and moved relative to a workpiece (not shown) in the direction crossing the axis O.

The edge part 20 has four spiral flutes 21 formed at an equal interval around the axis O, and four peripheral edges 22 are formed spirally along the spiral flutes 21 around the axis O.

Four bottom edges 23 are formed continuous to the peripheral edges 22 at the end of the edge part 20. In the present embodiment; the peripheral edges 22 are formed as roughing formed cutting edges (see FIG. 2).

Figure 2:
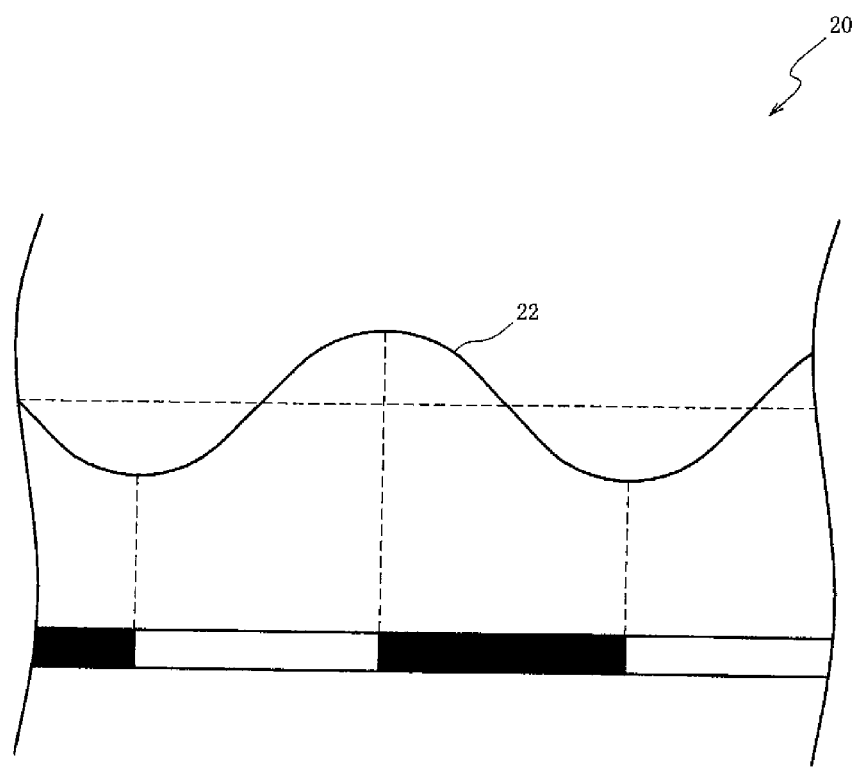
FIG. 2 is a schematic development of a peripheral edge.
Figure 3:
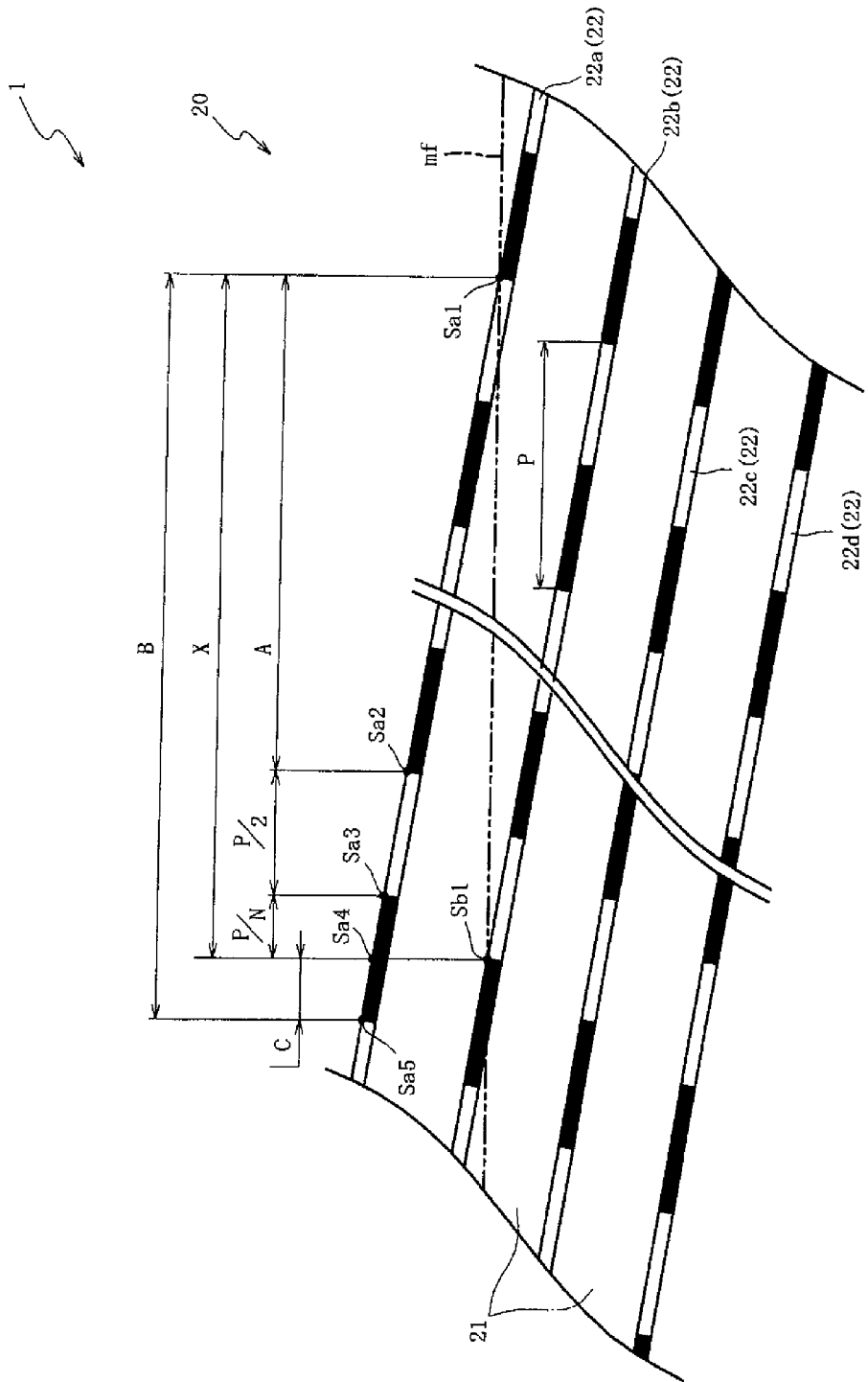
FIG. 3 is a plane development of an edge part.

Next, with reference to FIGS. 2 and 3, the phase relationship of waveforms of adjacent ones of the peripheral edges 22 is explained. FIG. 2 is a schematic development of the peripheral edge 22, and corresponds to a view of the peripheral edge 22 seen from a cutting face (i.e. from the spiral flute 21) (a view of the peripheral edge 22 being developed at a same position around the axis O).

As shown in FIG. 2, the peripheral edge 22 is formed as a roughing formed cutting edge whose edge diameter changes smoothly periodically with waveforms of a same shape (in the present embodiment, a shape with continuous arc-like convex and concave) being formed repeatedly and continuously at a same pitch.

Here, in the following, to simplify the drawings and to make it easier to understand, the waveform of the peripheral edge 22 is illustrated instead with black and white, alternating and continuous rectangles. That is, a half-pitch of the waveform of the peripheral edge 22 is illustrated to correspond to a white rectangle, and another half-pitch of the waveform of the peripheral edge 22 is illustrated to correspond to a black rectangle.

FIG. 3 is a plane development of the edge part 20, and corresponds to a view of a cylindrical surface configured with the peripheral edges 22 being developed into a plane. In FIG. 3, a machined surface mf of a workpiece is illustrated schematically with chain double-dashed line, and the peripheral edges 22 are illustrated with the black and white rectangles explained using FIG. 2. For convenience of explanation, the four peripheral edges 22 are explained by distinguishing them by giving numerals "22a to 22d" respectively.

As shown in FIG. 3, the edge part 20 is formed with the peripheral edges 22a to 22d as right hand cuts (the cutting edges are on the right side as seen from the shank 10 (the right side in FIG. 3)), and the direction of the spiral (spiral direction) of the spiral flute 21 is to the right. In this case, the phases of the waveforms of adjacent ones of the peripheral edges 22a to 22d in the axis O direction (the left-right direction in FIG. 3) are arranged to shift in the direction opposite to the spiral direction of the spiral flute 21.

Assuming that P is the waveform pitch of the peripheral edges 22a to 22d, and N is the number of edges of the peripheral edges 22a to 22d, the phase shifts of the waveforms in the axis O direction are set to a value obtained by dividing the pitch P with the number of edges N (P/N, see FIG. 3)). That is, the phases of the waveforms of adjacent ones of the peripheral edges 22a to 22d in the axis O direction are shifted by P/N so that the phases are shifted by one pitch per round.

Here, assuming that L is the lead (flute lead) of the spiral flutes 21, and m is a natural number, the edge part 20 is configured such that the values of L and m, the waveform pitch P, and the number of edges N satisfy a relational expression, $L/N = m \times P + P/N + P/2$ or $L/N = m \times P + P/N - P/2$.

Thereby, when adjacent ones of the peripheral edges 22a to 22d (in FIG. 3, the peripheral edge 22a and the peripheral edge 22b) cut the machined surface mf of the workpiece simultaneously, the waveforms of the adjacent ones of the peripheral edges 22a to 22d at the positions where they contact the machined surface mf of the workpiece simultaneously (in FIG. 3, a position Sa1 of the peripheral edge 22a, and a position Sb1 of the peripheral edge 22b) are in an anti-phase relationship. That is, at the position Sa1, a convex part of the waveform contacts the machined surface mf, and on the other hand, at the position Sb1, a concave part of the waveform (i.e. a part that is in anti-phase to the position Sa1) contacts the machined surface mf. Therefore, the length of the cutting edges that contact a machined surface mf of the workpiece simultaneously is shortened to reduce the maximum value of cutting resistance surely.

Here, the above-described relational expressions of the first embodiment are explained. The distance in the axis O direction between the position Sa1 and the position Sb1 (i.e. the positions of the peripheral edges 22a and 22b where they contact the machined surface mf of the workpiece simultaneously) is assumed to be X. Because the peripheral edges 22a to 22d are formed at an equal interval in the circumferential direction, the distance X that is the interval in the axis O direction between adjacent ones of the peripheral edges 22a to 22d is expressed, using the lead L and the number of edges N, as $X = L/N$.

On the other hand, in the present invention, because the phases of waveforms at the position Sa1 and the position Sb1 are in anti-phase, the distance X has to meet either one of the following relationships (either one of a first relationship and a second relationship).

A distance A in the axis O direction between the position Sa1 and a position Sa2 is expressed, using the natural number m and the waveform pitch P, as $A = m \times P$. (It should be noted that m is a maximum value such that the position Sa2 does not go over the position Sb1 in the axis O direction (is not positioned to the left of the position Sb1 in FIG. 3).)

The distance in the axis O direction between the position Sa2 and a position Sa3 is half the waveform pitch P, or P/2, and because the phase shifts of the waveforms are one pitch per round as described above (i.e. the phases of adjacent ones of the peripheral edges 22a to 22d are shifted by P/N), the distance in the axis O direction between the position Sa3 and a position Sa4 is P/N.

Therefore, the distance in the axis O direction between the position Sa1 and the position Sa4 is expressed, using the distance A, as $A + P/2 + P/N = m \times P + P/2 + P/N$. Because the distance is equal to the distance in the axis O direction between the position Sa1 and the position Sb1 (i.e. the distance X (=L/N), this leads to the first relational expression of the distance X, $L/N = m \times P + P/N + P/2$.

Similarly, a distance B in the axis O direction between the position Sa1 and a position Sa5 is expressed, using the natural number m and the waveform pitch P, as $B = m \times P$. (It should be noted that m is a minimum value such that the position Sa5 goes over the position Sb1 in the axis O direction (is positioned to the left of the position Sb1 in FIG. 3). That is, m is larger than the natural number m in the first relational expression by "1".)

Because a distance C in the axis O direction between the position Sa4 and the position Sa5 is a distance obtained by subtracting P/N (i.e. the distance in the axis O direction between the position Sa3 and the position Sa4) from a half distance of the waveform pitch P (i.e. the distance in the axis O direction between the position Sa3 and the position Sa5), the distance C is expressed as $C = P/2 - P/N$.

Therefore, the distance in the axis O direction between the position Sa1 and the position Sa4 is expressed, using the distance B, as $B - C = m \times P - (P/2 - P/N) = m \times P - P/2 + P/N$. Because the distance is equal to the distance in the axis O direction between the position Sa1 and the position Sb1 (i.e. the distance X (=L/N)), this leads to the second relational expression of X; $L/N = m \times P + P/N - P/2$.

Figure 4:
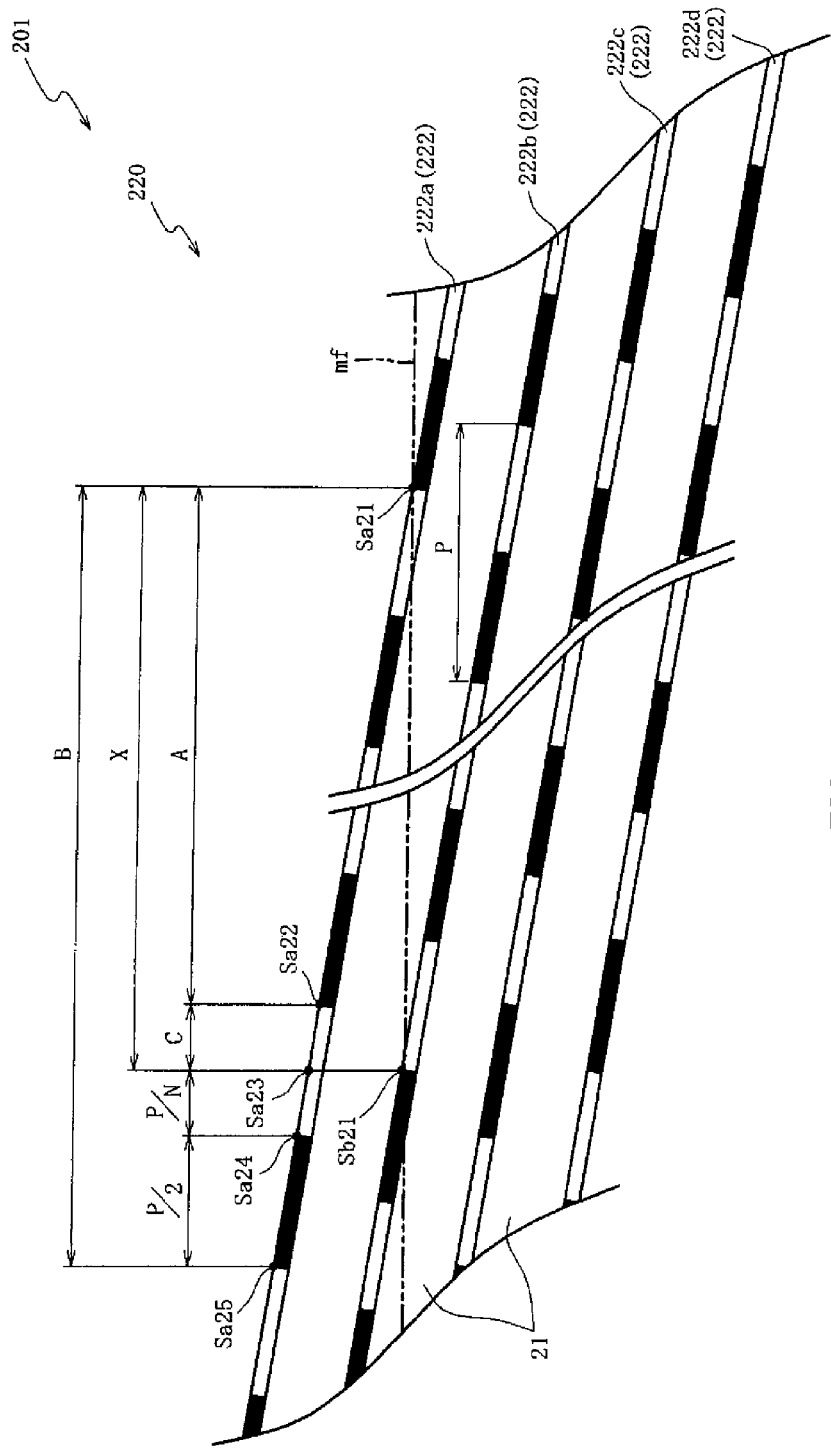
FIG. 4 is a plane development of an edge part of a roughing end mill in a second embodiment.

Next, a roughing end mill 201 in a second embodiment is explained with reference to FIG. 4. FIG. 4 is a plane development of an edge part 220 of the roughing end mill 201 in the second embodiment, and corresponds to a view of a cylindrical surface configured with peripheral edges 222 being developed into a plane. In FIG. 4, similar to FIG. 3, the machined surface mf of the workpiece is illustrated schematically with chain double-dashed line, and the peripheral edges 222 are illustrated with the black and white rectangles explained using FIG. 2. For convenience of explanation, the four peripheral edges 222 are explained by distinguishing them by giving numerals "222a to 222d" respectively.

Although, in the first embodiment, the phases of the waveforms of adjacent ones of the peripheral edges 22 in the axis O direction are arranged to shift in the direction opposite to the spiral direction of the spiral flute 21, the phases of the waveforms of adjacent ones of the peripheral edges 222a to 222d in the axis O direction are arranged to shift in a direction same with the spiral direction of the spiral flute 21 in the second embodiment. The parts same with those of the first embodiment are given the same numerals, and explanation thereof is omitted.

As shown in FIG. 4, the edge part 220 in the second embodiment, similar to the first embodiment, is formed with the peripheral edges 222a to 222d as right hand cuts, and the direction of the spiral (spiral direction) of the spiral flute 21 is to the right. On the other hand, in the edge part 220 in the second embodiment, the phases of the waveforms of adjacent ones of the peripheral edges 222a to 222d in the axis O direction (the left-right direction in FIG. 4) are arranged to shift in a direction same with the spiral direction of the spiral flute 21, opposite to that in the first embodiment.

The phase shifts of the waveforms in the axis O direction are similar to those in the first embodiment, and are set to a value obtained by dividing the pitch P with the number of edges N (P/N, see FIG. 4). That is, the phases of the waveforms of adjacent ones of the peripheral edges 222a to 222d in the axis O direction are shifted by P/N so that the phases are shifted by one pitch per round.

Here, the edge part 220 in the second embodiment is configured such that the lead L, the natural number m, the pitch P, and the number of edges N satisfy a relational expression, $L/N=m \times P - P/N + P/2$ or $L/N=m \times P - P/N - P/2$.

Thereby, when adjacent ones of the peripheral edges 222a to 222d (in FIG. 4, the peripheral edge 222a and the peripheral edge 222b) cut the machined surface mf of the workpiece simultaneously, the waveforms of the adjacent ones of the peripheral edges 222a to 222d at the positions where they contact the machined surface mf of the workpiece simultaneously (in FIG. 4, a position Sa21 of the peripheral edge 222a, and a position Sb21 of the peripheral edge 222b) are in an anti-phase relationship as in the first embodiment. Therefore, the length of the cutting edges that contact the workpiece simultaneously is shortened to reduce the maximum value of cutting resistance surely.

Here, the above-described relational expressions are explained; The distance in the axis O direction between the position Sa21 and the position Sb21 (i.e. the positions of the peripheral edges 222a and 222b where they contact the machined surface mf of the workpiece simultaneously) is assumed to be X. Because the peripheral edge 222a to 222d are formed at an equal interval in the circumferential direction, the distance X that is the interval in the axis O direction between adjacent ones of the peripheral edges 222a to 222d is expressed, using the lead L and the number of edges N, as $X=L/N$.

On the other hand, in the present invention, because the phases of waveforms at the position Sa21 and the position Sb21 are in anti-phase, the distance X has to meet either one of the following relationships (either one of a third relationship and a fourth relationship).

A distance A in the axis O direction between the position Sa21 and a position Sa22 is expressed, using the natural number m and the waveform pitch P, as $A=m \times P$. (It should be noted that m is a maximum value such that the position Sa22 does not go over the position Sb21 in the axis O direction (is not positioned to the left of the position Sb21 in FIG. 4).)

Because the phases of the waveforms are shifted by one pitch per round as described above (i.e. the phases of adjacent ones of the peripheral edges 222a to 222d are shifted by P/N), the distance in the axis O direction between a position Sa23 and a position Sa24 is P/N. Because a distance C in the axis O direction between the position Sa22 and the position Sa23 is obtained by subtracting P/N (i.e. the distance in the axis O direction between the position Sa23 and the position Sa24) from a half distance of the waveform pitch P (i.e. the distance in the axis O direction between the position Sa22 and the position Sa24)), the distance C is expressed as $C=P/2-P/N$.

Therefore, the distance in the axis O direction between the position Sa21 and the position Sa23 is expressed; using the distance A, as $A+C=m \times P + P/2 - P/N$. Because the distance is equal to the distance in the axis O direction between the position Sa21 and the position Sb21 (i.e. the distance X (=L/N)), this leads to the third relational expression of X, $L/N=m \times P - P/N + P/2$.

Similarly, a distance B in the axis O direction between the position Sa21 and a position Sa25 is expressed, using the natural number m and the waveform pitch P, as $B=m \times P$. (It should be noted that m is a minimum value such that the position Sa25 goes over the position Sb21 in the axis O direction (is positioned to the left of the position Sb21 in FIG. 4). That is, m is larger than the natural number m in the third relational expression "1".)

The distance in the axis O direction between the position Sa23 and the position Sa24 is P/N as described above, and the distance in the axis O direction between the position Sa24 and the position Sa25 is half the waveform pitch P, or P/2.

Therefore, the distance in the axis O direction between the position Sa21 and the position Sa23 is expressed, using distance B, as $B-(P/2+P/N)=m \times P-(P/2+P/N)=m \times P - P/2 - P/N$. Because the distance is equal to the distance in the axis O direction between the position Sa21 and the position Sb21 (i.e. the distance X (=L/N)), this leads to the fourth relational expression of X, $L/N=m \times P - P/N - P/2$.

Figure 5:
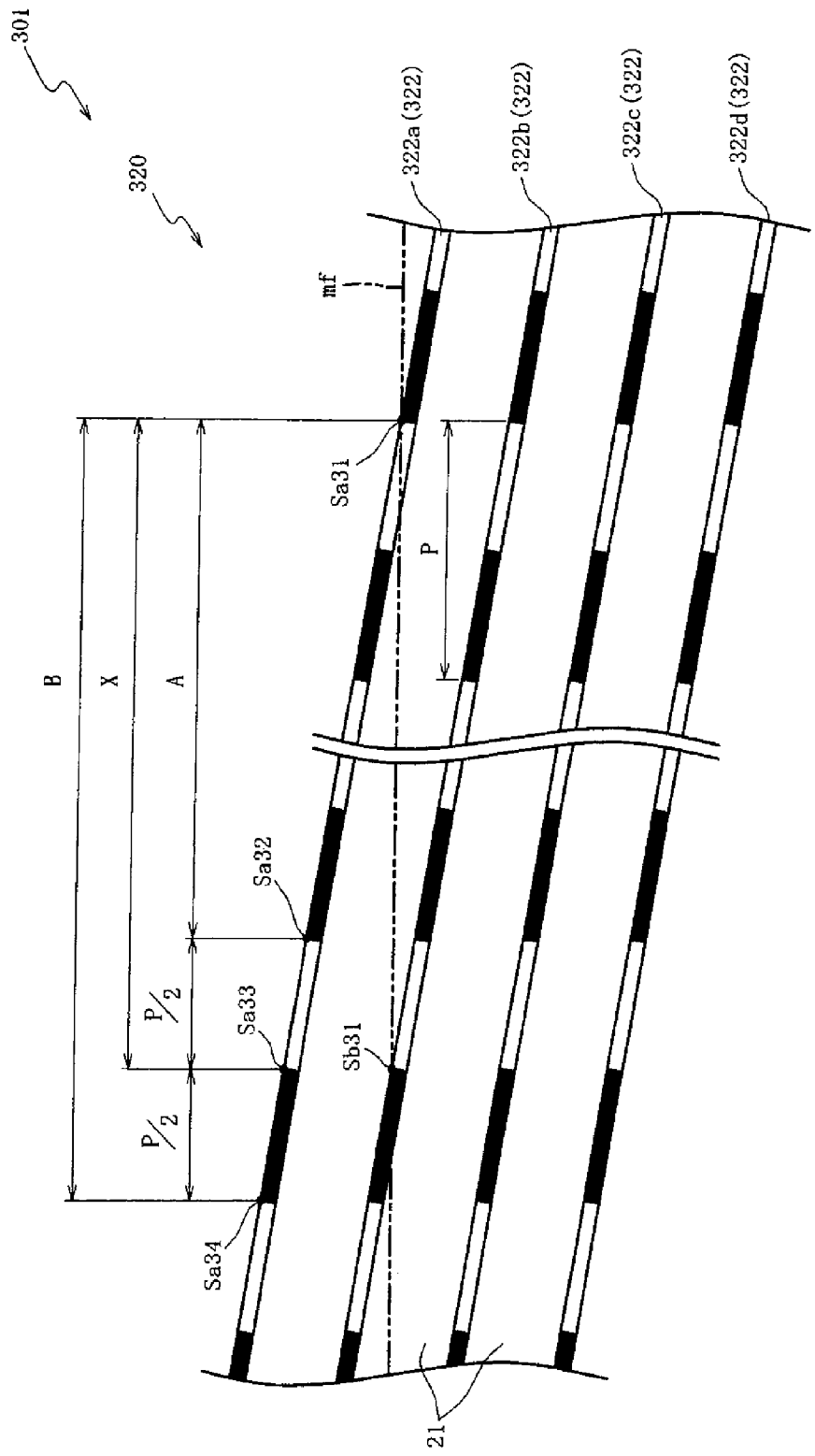
FIG. 5 is a plane development of an edge part of a roughing end mill in a third embodiment.

Next, a roughing end mill 301 in a third embodiment is explained with reference to FIG. 5. FIG. 5 is a plane development of an edge part 320 of the roughing end mill 301 in the third embodiment, and corresponds to a view of a cylindrical surface configured with peripheral edges 322 being developed into a plane. In FIG. 5, similar to FIG. 3, the machined surface mf of the workpiece is illustrated schematically with chain double-dashed line.

Figure 6:
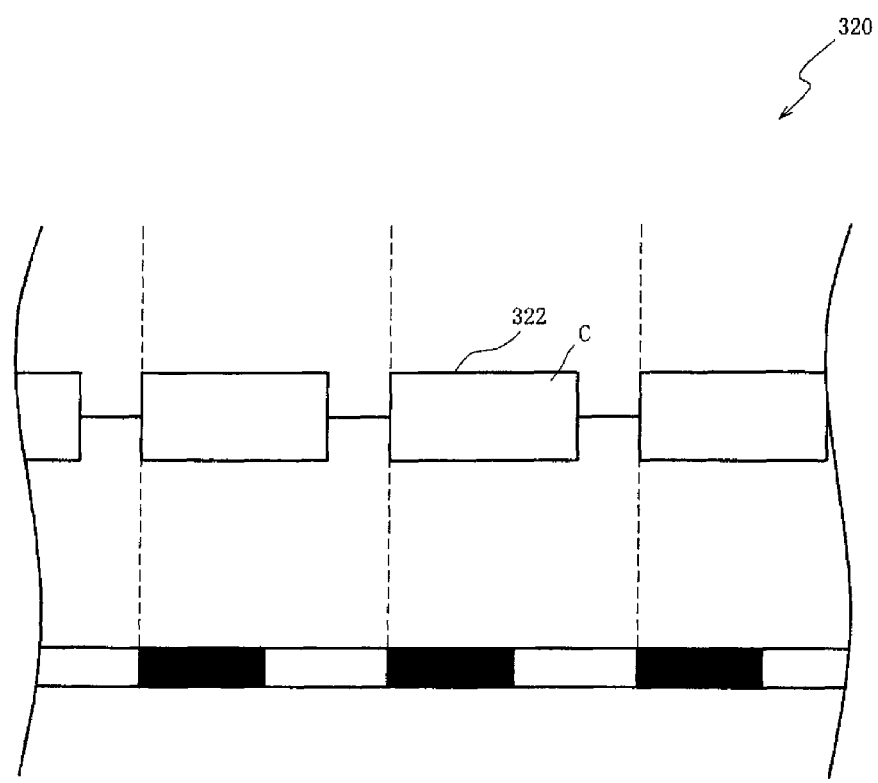
FIG. 6 is a schematic development of a peripheral edge.

Here, the roughing end mill 301 in the third embodiment is an indexable end mill having the spiral flutes 21 with plural threads (four threads in the present embodiment), and the peripheral edges 322 formed with plural detachable tips (indexable inserts) along the spiral flute 21, and is configured as a roughing end mill in which an array of the tips is set stepwise to provide the same effect with that of the peripheral edges with nicked teeth (see FIG. 6).

In FIG. 5, the peripheral edges 322 are illustrated with the black and white rectangles explained in FIG. 2. Here, with reference to FIG. 6, the relationship between the peripheral edges 322 and the black and white rectangles in the third embodiment is explained. FIG. 6 is a schematic development of the peripheral edge 322, and corresponds to a view of the peripheral edge 322 seen from a cutting face (i.e. from the spiral flute 21) (i.e. a view of the peripheral edge 322 formed by tips C being developed at a same position around the axis O).

As shown FIG. 6, the peripheral edge 322 is formed with the plural the tips C disposed at a constant gap with waveforms of a same shape continuing repeatedly at a same pitch. In this case, in the present embodiment, a set of one black rectangle and one white rectangle is assumed to be one unit, and the unit is illustrated as one pitch of a waveform composed of the single tip C and one gap.

The present embodiment is explained returning to FIG. 5. In FIG. 5, for convenience of explanation, the four peripheral edges 322 formed along the four-thread spiral flute 21 are explained by distinguishing them by giving numerals "322a to 322d".

Although, in the first embodiment, the phases of the waveforms of adjacent ones of the peripheral edges 22 in the axis O direction are arranged to shift in the direction opposite to the spiral direction of the spiral flute 21, the phases of the waveforms of adjacent ones of the peripheral edges 322 in the axis O direction are arranged to be in phase (with no shifts therebetween) in the third embodiment. The parts same with those of the first embodiment are given the same numerals, and explanation thereof is omitted.

As shown in FIG. 5, the edge part 320 in the third embodiment, similar to that in the first embodiment; is formed with the peripheral edges 322a to 322d as right hand cuts, and the direction of the spiral (spiral direction) of the spiral flute 21 is to the right. On the other hand, in the edge part 320 in the third embodiment, the phases of the waveforms of adjacent ones of the peripheral edges 322a to 322d in the axis O direction (the left-right direction in FIG. 5) are arranged to be in phase (i.e. the phase shifts are zero).

Here, the edge part 320 in the third embodiment is configured such that the lead L, the natural number m, the pitch P, and the number of edges N satisfy a relational expression, $L/N = m \times P + P/2$ or $L/N = m \times P - P/2$.

Thereby, when adjacent ones of the peripheral edges 322a to 322d (in FIG. 5, the peripheral edge 322a and the peripheral edge 322b) cut the machined surface mf of the workpiece simultaneously, the waveforms of the adjacent ones of the peripheral edges 322a to 322d at the positions where they contact the machined surface mf of the workpiece simultaneously (in FIG. 5, a position Sa31 of the peripheral edge 322a, and a position Sb31 of the peripheral edge 322b) are in an anti-phase relationship as in the first embodiment. Therefore, the length of the cutting edges that contact the machined surface mf of the workpiece simultaneously is shortened to reduce the maximum value of cutting resistance surely.

Here, the above-described relational expressions in the third embodiment are explained. The distance in the axis O direction between the position Sa31 and the position Sb31 (i.e. the positions of the peripheral edges 322a and 322b where they contact the machined surface mf of the workpiece simultaneously) is assumed to be X. Because the peripheral edge 322a to 322d are formed at an equal interval in the circumferential direction, the distance X that is the interval in the axis O direction between adjacent ones of the peripheral edges 322a to 322d is expressed, using the lead L and the number of edges N, as $X = L/N$.

On the other hand, in the present invention, because the phases of waveforms at the position Sa31 and the position Sb31 are in anti-phase, the distance X has to meet either one of the following relationships (either one of a fifth relationship and a sixth relationship).

A distance A in the axis O direction between the position Sa31 and a position Sa32 is expressed, using the natural number m and the waveform pitch 2, as $A = m \times P$. (It should be noted that m is a maximum value such that the position Sa32 does not go over the position Sb31 in the axis O direction (is not positioned to the left of the position Sb31 in FIG. 5).)

The distance in the axis O direction between the position Sa32 and a position Sa33 is half the waveform pitch P, or P/2. Therefore, the distance in the axis O direction between the position Sa31 and the position Sa33 is expressed, using the distance A, as $A + P/2 = m \times P + P/2$. Because the distance is equal to the distance in the axis O direction between the position Sa31 and the position Sb31 (i.e. the distance X (=L/N)), this leads to the fifth relational expression of X, $L/N = m \times P + P/2$.

Similarly, a distance B in the axis O direction between the position Sa31 and a position Sa34 is expressed, using the natural number m and the waveform pitch P, as $B = m \times P$. (It should be noted that m is a minimum value such that the position Sa34 goes over the position Sb31 in the axis O direction (is positioned to the left of the position Sb31 in FIG. 5). That is, m is larger than the natural number m in the fifth relational expression by "1".)

The distance in the axis O direction between the position Sa33 and a position Sa34 is half the waveform pitch P, or P/2. Therefore, the distance in the axis O direction between the position Sa31 and the position Sa33 is expressed, using the distance B, as $B - P/2 = m \times P - P/2$. Because the distance is equal to the distance in the axis O direction between the position Sa31 and the position Sb31 (i.e. the distance X (=L/N)), this leads to the sixth relational expression of X, $L/N = m \times P - P/2$.

Next, test results of a cutting test performed using the above-described roughing end mill 1 are explained. In the cutting test, cutting process was performed on a workpiece using the roughing end mill 1, and the maximum value of cutting resistance (a resultant force of a feed force acting in a feed direction (a horizontal component force)), a cutting force acting in a direction vertical to the direction of the feed force (a vertical component force), and a thrust force acting in an axial direction (an axial component force) that is generated at the cutting process is measured.

Detailed specifications of the cutting test are as follows: workpiece: JIS-S50C; cutting method: side cutting (down cutting); cutting oil: not used (dry-cutting by air blow); machine used: vertical machining center; cutting speed: 40.8 m/min; feed speed: 360 mm/min (0.14 mm/rotation); axial depth of cut: 30 mm; radial depth of cut: 5 mm.

The roughing end mill 1 (hereinafter, "the present invention") is a tool explained in the first embodiment, and the detailed specifications are as follows: tool material: high-speed tool steel; outer diameter: 20 mm; number of edges N: 4; flute lead L: 107.5 mm; waveform pitch P: 2.5 mm; orientation of peripheral edges: right hand cut; spiral direction: right spiral; shift direction of waveform: opposite to the spiral direction of the spiral flute.

The cutting test was performed, in addition to the present invention, on a roughing end mill (hereinafter, "the conventional product"), the specifications of which are identical with those of the present invention, but only the value of the flute lead L of which is different from that of the present invention. The flute lead L of the conventional product is 112 mm.

The present invention is a tool that satisfies the above-described first relational expression and second relational expression with the natural number m in the first relational expression being set to 10 or the natural number m in the second relational expression being set to 11. Therefore, in the cutting test, the phases of the waveforms of adjacent ones of the peripheral edges 22 at the positions where they contact the machined surface mf of the workpiece simultaneously are in an anti-phase relationship when the adjacent ones of the peripheral edges 22 cut the machined surface mf of the workpiece simultaneously (see FIG. 3).

On the other hand, the conventional product does not meet either of the above-described first relational expression and second relational expression, and in the cutting test, the waveforms of adjacent ones of the peripheral edges 22 at the positions where they contact the machined surface mf of the workpiece simultaneously are in an in-phase relationship when the adjacent ones of the peripheral edges 22 cut the machined surface mf of the workpiece simultaneously.

Therefore, in the cutting test, the length of cutting edges that contact the machined surface mf of the workpiece simultaneously is the shortest for the present invention, and the longest for the conventional product.

The results of the cutting test confirmed the approximately 6.5% reduction of the maximum value of the cutting resistance (a resultant force of a feed force, a cutting force, and a thrust force), 3269 [N] for the conventional product, and 3056 [N] for the present invention.

In addition to the cutting test, cutting tests (hereinafter, "the second cutting test", and "the third cutting test") were performed in which only the axial depth of cut and the radial depth of cut were changed, and the other specifications were the same. In the second cutting test, the axial depth of cut was set to 30 mm, and the radial depth of cut was set to 3 mm, and in the third cutting test, the axial depth of cut was set to 35 mm, and the radial depth of cut was set to 3 mm.

The second cutting test confirmed the approximately 2.7% reduction of the maximum value of the cutting resistance, 2116 [N] for the conventional product, and 2060 [N] for the present invention. The third cutting test confirmed the approximately 9.3% reduction of the maximum value of the cutting resistance, 3155 [N] for the conventional product, and 2896 [N] for the present invention.

As can be seen, it was confirmed that, by making the waveforms of adjacent ones of the peripheral edges at the positions where they contact the machined surface mf of the workpiece simultaneously in an anti-phase relationship when the adjacent peripheral edges cut the machined surface mf of the workpiece simultaneously, the length of the cutting edges that contact the machined surface mf of the workpiece simultaneously can be shortened, and as a result the maximum value of cutting resistance can be reduced.

The present invention has been explained based on embodiments; however, the present invention is not at all limited by the above-described embodiments, but it can be inferred easily that various improvements and modifications are possible in a range that does not deviate from the gist of the present invention.

For example, the values mentioned in the above-described embodiments are exemplary, and other values can naturally be adopted.

Although explanation thereof is omitted in the above-described embodiments, in setting the values (the flute lead L, the natural number m, the waveform pitch P, and the number of edges N) to meet any of the first to sixth relational expressions, tolerable ranges can naturally be set for the values. For example, a tolerance of a value (L/N) that meets each of the relational expressions is set to ±(0.1×P/N) in one example. By adopting the tolerance, it becomes possible to achieve both the reduction of the maximum value of cutting resistance and the reduction of the manufacturing cost of a tool.

Although in the above-described first embodiment and second embodiment, the direction of the spiral (spiral direction) of the spiral flute 21 is to the right, the direction is not limited thereto, but can naturally be to the left. In this case, the values (the flute lead L and the like) may be set such that they satisfy the above-described first relational expression or second relational expression when the phases of the waveforms of adjacent ones of the peripheral edges in the axis O direction are arranged to shift in a direction opposite to the spiral direction of the spiral flute 21, and satisfy the above-described third relational expression or fourth relational expression when the phases of the waveforms of adjacent ones of the peripheral edges in the axis O direction are arranged to shift in a direction same with the spiral direction of the spiral flute 21.

Although in the above-described first embodiment and second embodiment, a tool having roughing formed cutting edges is explained as an example, the tool is not limited thereto, but the technical ideas of the present invention can naturally be applied to other tools. Examples of other tools include an interrupted end mill having interrupted cutting edges provided with nicked teeth at its peripheral edges, a thread milling cutter having peripheral edges with plural threads, and a form relieved milling cutter having peripheral edges with plural threads.

Figure 7:
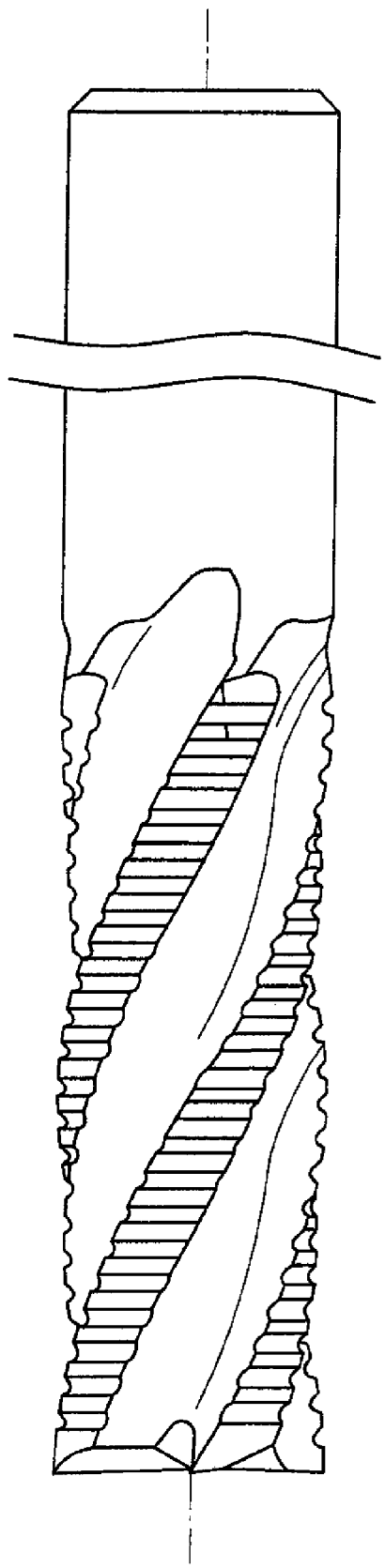
FIG. 7 is a front view of an end mill with nicked teeth.

An interrupted end mill having interrupted cutting edges is shown in FIG. 7 as an example of application targets of the present invention. As shown in FIG. 7, in a peripheral edge of the interrupted end mill with nicked teeth, waveforms of a same shape are formed repeatedly and continuously at a same pitch. Therefore, similar to the above-described embodiments, by setting the values L and m, the waveform pitch P, and the number of edges N to satisfy any of the above-described relational expressions, the waveforms of the adjacent peripheral edges at the position where they contact the workpiece simultaneously can be made in an anti-phase relationship; as a result, the length of the cutting edges that contact the workpiece simultaneously is shortened to reduce the maximum value of cutting resistance.

REFERENCE SIGNS LIST 1, 201, 301 roughing end mill (tool)
21 spiral flute
22, 222, 322 peripheral edge
22a to 22d, 222a to 222d, 322a to 322d peripheral edge
L flute lead (lead)
P waveform pitch
N number of edges
m natural number
O axis

The invention claimed is:

1. A tool having a plurality of spiral flutes formed spirally with a predetermined lead, and a plurality of peripheral edges formed along the spiral flutes, in which waveforms of a same shape are formed repeatedly at a predetermined pitch, the tool performing cutting process on a workpiece with the peripheral edges by being rotated about an axis, wherein
   phases of waveforms of adjacent ones of the peripheral edges in a direction of the axis are arranged to shift in a direction same as a direction of the spiral of the spiral flute; and
   when it is assumed that L is the lead of the spiral flutes, P is the pitch of the waveforms, N is the number of edges of the peripheral edges, and m is a natural number, L, P, N, and m satisfy:

$$L/N = m \times P - P/N + P/2 \text{ or } L/N = m \times P - P/N - P/2.$$

2. A tool having a plurality of spiral flutes formed spirally with a predetermined lead, and a plurality of peripheral edges formed along the spiral flutes, in which waveforms of a same shape are formed repeatedly at a predetermined pitch, the tool performing cutting process on a workpiece with the peripheral edges by being rotated about an axis, wherein phases of waveforms of adjacent ones of the peripheral edges in a direction of the axis are arranged to shift in a direction opposite to a direction of the spiral of the spiral flute; and when it is assumed that L is the lead of the spiral flutes, P is the pitch of the waveforms, N is the number of edges of the peripheral edges, and m is a natural number, L, P, N, and m satisfy:

$L/N = m \times P + P/N + P/2$ or $L/N = m \times P + P/N - P/2$.

* * * * *